US012218832B1

(12) United States Patent
Huang et al.

(10) Patent No.: US 12,218,832 B1
(45) Date of Patent: Feb. 4, 2025

(54) MANAGING AND ROUTING PAYLOADS FOR CLIENT EDGE DEVICES THAT USE MULTIPLE TYPES OF RADIOS

(71) Applicant: Amazon Technologies, Inc., Seattle, WA (US)

(72) Inventors: Rongsheng Huang, San Jose, CA (US); Jungtao Liu, Saratoga, CA (US); Hongbo Tian, Fremont, CA (US); Yinghua Ye, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 17/219,644

(22) Filed: Mar. 31, 2021

(51) Int. Cl.
| H04L 45/00 | (2022.01) |
| H04L 45/24 | (2022.01) |
| H04L 45/44 | (2022.01) |
| H04W 12/06 | (2021.01) |
| H04W 40/06 | (2009.01) |

(52) U.S. Cl.
CPC ............ H04L 45/566 (2013.01); H04L 45/24 (2013.01); H04L 45/44 (2013.01); H04W 12/06 (2013.01); H04W 40/06 (2013.01)

(58) Field of Classification Search
None
See application file for complete search history.

(56) References Cited

U.S. PATENT DOCUMENTS

| 9,391,914 B2 * | 7/2016 | Van Wyk | H04L 47/365 |
| 2011/0116414 A1 | 5/2011 | Lee et al. | |
| 2014/0376473 A1 * | 12/2014 | Leng | H04W 76/10 370/329 |
| 2015/0249928 A1 | 9/2015 | Alicot et al. | |
| 2019/0150074 A1 * | 5/2019 | Narayanan | H04W 72/1215 455/434 |
| 2020/0028836 A1 * | 1/2020 | Gandhi | H04L 63/062 |
| 2020/0127681 A1 * | 4/2020 | Verma | H04L 1/0079 |
| 2022/0109694 A1 * | 4/2022 | Takeichi | H04L 63/0236 |

FOREIGN PATENT DOCUMENTS

| CN | 108574991 A | * | 9/2018 | ......... H04W 72/082 |
| CN | 112671638 A | * | 4/2021 | |

* cited by examiner

Primary Examiner — Ario Etienne
Assistant Examiner — Mohammad Yousuf A. Mian
(74) Attorney, Agent, or Firm — Robert C. Kowert; Kowert, Hood, Munyon, Rankin & Goetzel, P.C.

(57) ABSTRACT

A multi-radio service of a provider network may be used to manage and route payloads for client edge devices that use multiple types of radios. The multi-radio service may associate different types of radio controllers with an edge device of a client, so that messages that are transmitted from different types of edge device radios can be handled by different radio controllers. A radio controller may receive a message and extract the payload from the message based on the data/data format specific to the radio protocol used to transmit the message. When a client-owned cloud application sends a payload to an edge device, the multi-radio service may select, based on criteria (e.g., fastest data transmission), the radio of the edge device from multiple available radios. The corresponding radio controller may then generate and send a message to the selected radio of the edge device (e.g., via a corresponding gateway).

20 Claims, 8 Drawing Sheets

MANAGING AND ROUTING PAYLOADS FOR CLIENT EDGE DEVICES THAT USE MULTIPLE TYPES OF RADIOS

BACKGROUND

The Internet of Things (IoT) is a phrase given for the interconnection of computing devices scattered around the globe within the existing internet infrastructure. Clients of a remote service provider may leverage the internet-based connectivity of IoT devices (also referred to herein as edge devices) by using a service offered by the service provider. For example, a temperature sensor installed on a machine at a client site may collect temperature values and transmit them to the service provider for analysis.

A client's network may include edge devices that communicate wirelessly using radios. For example, an edge device may include a low-power wide-area network ("LoRa") radio that allows the edge device to transmit messages according to a LoRa protocol. A provider network may manage traffic received from the edge device (e.g., receive traffic originating from the edge device, authenticate the traffic). For example, a service at the provider network may authenticate the traffic and forward data to a client-owned application running at the service provider network to process the data. However, the service is unable to authenticate traffic from a different device using a different radio protocol. For similar reasons, clients are unable to take advantage of an edge device capable of transmitting and receiving messages using more than one type of radio.

Figure 1:
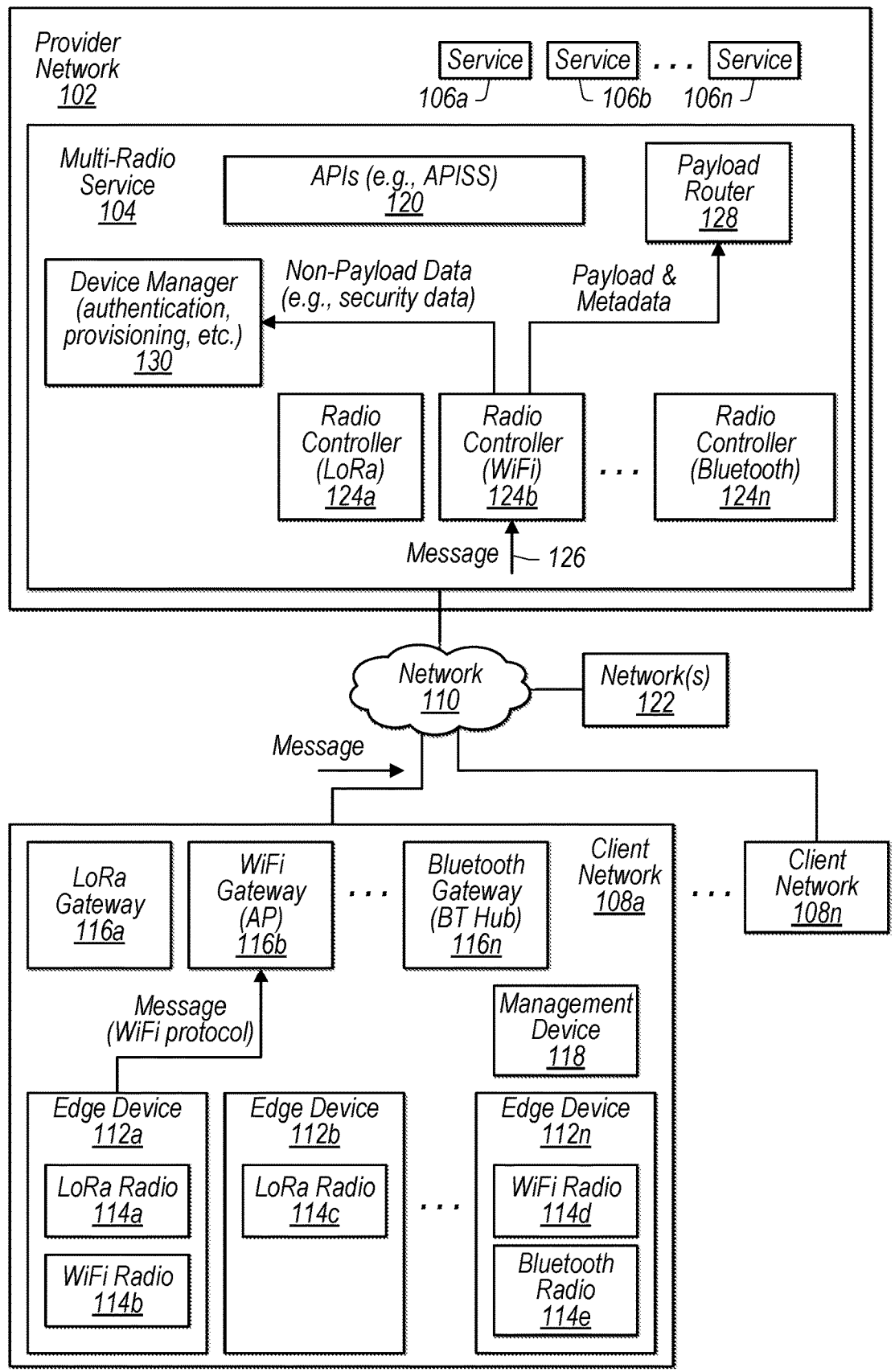
FIG. 1 is a logical block diagram illustrating a system for managing and routing payloads for client edge devices that use multiple types of radios, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to manage and route payloads for client edge devices that use multiple types of radios, according to some embodiments. In embodiments, managing and routing payloads for client edge devices that use multiple types of radios may allow edge data processing applications to receive payloads from and send payloads to edge devices with different types of radios, without the need to handle radio-specific protocols. A client's application running at a service provider network may process payloads in a "radio-agnostic" manner (e.g., with little or no knowledge of the radio communication protocol used by the edge device that transmitted the payload), allowing the application to receive payloads from and send payloads to edge devices that use any number of different radio communication protocols.

As described herein, a multi-radio service may perform radio-specific handling for any number of radio communication protocols, which may increase the amount of payload data received from edge devices and sent to edge devices compared to traditional techniques. Furthermore, the ability of a multi-radio service to add new radio controllers to handle new types of radios improves the client's flexibility to make changes to the types edge devices used, with minimal or no interruption and/or minimal or no reduction in performance of their data processing applications at the provider network, compared to traditional techniques.

In embodiments, a multi-radio service may implement some or all of the functionality that a client's network servers (e.g., "core network") may have previously performed for any type of radio protocol according to traditional techniques. For example, a company may have specified a group of network servers (e.g., LoRa network servers) as the core network for managing edge devices that use LoRa radios ("LoRa edge devices" or "LoRa-enabled edge devices"). Some or all of these network servers may be managed on-site at the client's local network and/or remotely at a provider network. LoRa gateways may access these LoRa network servers to transfer the LoRa edge devices. These core networks may also be responsible to authenticate/authorize edge devices' traffic as well as to manage any other aspects of the devices. Besides these responsibilities, the core network may also route the devices' traffic to destinations (e.g., a client-owned cloud application running at a provider network).

In embodiments, it may be possible that one edge device's traffic is transferred via different types of radios and converged to the same cloud application. In the reverse direction, the cloud application may request the core network (e.g., the multi-radio service) to pass a payload to an edge device via the correct or optimal radios (e.g., depending on various criteria). In embodiments, a multi-radio service may be highly beneficial for a client that owns or plans to own multi-radio devices, because the client may continue to develop and test cloud applications without the need to consider any radio-specific protocols.

In some embodiments, in order to support multiple radios for edge devices as described herein, the core network (e.g., the multi-radio service) should meet some or all of the following criteria: 1) the ability to support multiple types of radios and to add support for any number of new types of radios; 2) the ability to handle radio-specific information (e.g., specific or unique to a particular type of radio communication protocol); 3) the ability to manage multiple radio types for one device (e.g., using address mapping between the device and multiple radios); 4) external APIs that provide the ability to support/manage multiple radio types; 5) the ability to select the most suitable radios for downlink traffic. As described herein, a multi-radio service may have both the ability to separate the destination application interface from radios (e.g., radio-specific data/formatting) and the ability to allow a client to add new types of radios to their network that can send data to and receive data from the destination application.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 8 and described below.

This specification begins with a description of a system for managing and routing payloads for client edge devices that use multiple types of radios. A number of different methods and techniques to manage and route payloads for client edge devices that use multiple types of radios are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for managing and routing payloads for client edge devices that use multiple types of radios, according to some embodiments.

As shown, a provider network 102 includes a multi-radio service 104 that implements managing and routing payloads for client edge devices that use multiple types of radios. In the example embodiment, the provider network 102 may include any number of other services 106a-106n. In embodiments, any number of the other services 106 may implement one or more client-owned applications that receive payload data from client edge devices and/or send data to client edge devices. In various embodiments, any of the described functionality of the multi-radio service may instead be implemented by one or more of the other services 106 (e.g., device authentication, device provisioning).

In the depicted embodiment, any number of clients of the multi-radio service 104 may use the multi-radio service 104 of the provider network 102 via communication between a remote network 108 of the corresponding client (e.g., via a wide area network 110, such as the internet). For example, a client may own/manage the client network 108a, which may include any number of edge devices 112 that send payloads to a client-owned application(s) and/or receive payloads from client-owned application(s) via the multi-radio service 104. Similarly, any other number of clients may use the multi-radio service 104 with any number of other edge devices in the same or similar manner as shown for client network 108a (e.g., using any number of the same and/or different types of radios 114, corresponding gateways 116, etc.).

In embodiments, one or more management devices 118 of a client network may be used to provide user input to and/or receive output from the multi-radio service 104 (e.g., via a graphical user interface and/or command line interface of a display device). As shown, the multi-radio service 104 includes application programming interfaces (APIs) 120 that may receive user input from and/or provide output to the management device (e.g., via the graphical user interface and/or command line interface). For example, a user may configure any number of aspects of the service using a management device at the client network.

In embodiments, a user at the client's site may use the management device to provide input to configure the multi-radio service 104, which may include registering edge devices, provisioning edge devices, and/or performing any other service/device management tasks. As discussed herein, in various embodiments the APIs may include APIs used by shared services (e.g., APIs that may be used by the multi-radio service and one or more other services 106 and/or other software applications).

As shown, any number of other networks may be in communication with the provider network and/or client networks via the wide-area network 110. For example, one or more of the networks 122 may include a mobile operator core network that communicates with one or more edge devices of a client network. As another example, one or more of the client-owned applications that process edge device data may be hosted on another network 122 (e.g., by another service provider network).

In some embodiments, the multi-radio service 104 may associate/assign any number of different radio controllers 124 with an edge device of a client (e.g., as part of the provisioning process for the edge device). A particular radio controller (e.g., radio controller 124n) may be capable of processing traffic (e.g., one or more messages) that has been transmitted from a particular type of radio (e.g., Bluetooth) in accordance with a radio communication protocol (or "radio protocol") that is unique to the particular type of radio (e.g., Bluetooth protocol). In embodiments, a particular radio controller is only capable of processing traffic for one type of radio (e.g., Bluetooth). Therefore, a different radio controller may be made available for each type of radio that is used by edge devices at the client's network.

In embodiments, a message transmitted to or from a radio according to a radio protocol includes a payload and associated information for a particular radio protocol used by the radio. For example, a message 126 transmitted from the WiFi radio 114b of the edge device 112a may include a payload (e.g., temperature data collected by a sensor at the edge device) as well as data corresponding to the radio communication protocol used to transmit the message (WiFi). In embodiments, the data corresponding to the radio communication protocol may include data that is unique to the radio communication protocol and/or that may be uniquely formatted (e.g., data and/or a data format that is different from any of the other radio protocols used by edge devices).

As shown, a WiFi gateway 116b (e.g., access point (AP)) may receive the WiFi message 126 transmitted from the edge device 112a. The WiFi gateway may be hardware and/or software that is capable of transmitting and receiving messages according to a WiFi radio protocol. In embodiments, a client network may include any number of different gateways that are respectively capable of transmitting and receiving messages according to a different radio protocol. For example, the LoRa gateway 116a may transmit and receive messages according to a LoRa radio protocol and the Bluetooth gateway 116n (e.g., BT Hub) may transmit and receive messages according to a Bluetooth radio protocol.

In embodiments, each of the gateways 116 may establish one or more connections (e.g., websockets) over the wide area network 110 with a respective radio controller of the multi-radio service. For example, the WiFi gateway 116b may establish one or more connections with the radio controller 124b in accordance with an internet communication protocol. In some embodiments, a gateway (e.g., WiFi gateway 116b) may establish a websocket with a radio controller (e.g., the radio controller 124b) that allows for messages to travel back and forth over hyper-text transfer protocol (HTTP) through a transmission control protocol/internet protocol (TCP/IP) socket connection.

When the radio controller 124b receives the message 126, it can process the message because it can recognize the data and/or the data format of WiFi messages. In embodiments, the message 126 includes a payload and associated information. The payload may include data to be processed at a destination of the provider network (e.g., a service 106 or other application) or a destination at another network 122. The associated information may include data corresponding to a radio communication protocol used to transmit the message at the remote client network (e.g., data and/or data format specific to the WiFi protocol).

The radio controller 124b may then identify and/or extract the payload and/or other data from the message (e.g., based on knowledge of the format of the radio protocol). The radio controller 124b may extract the payload based on identification of the data and/or data format specific to the WiFi protocol. For example, the radio controller 124b may identify, based on one or more types of data and/or a data format specific to the WiFi protocol, the payload data and other types of data of the message. In some embodiments, extracting the payload may include decrypting the message based on the particular radio communication protocol used to transmit the message at the remote network (e.g., identifying are type of encryption used by the WiFi protocol and decrypting the message based on the identified type of encryption).

The radio controller 124b may then send the extracted payload to the destination. As shown, the radio controller 124b may send the extracted payload to a router 128, which then routes the payload to the destination. For example, the router 128 may determine the destination based the payload and/or metadata that indicates the destination.

In embodiments, any number of radio controllers 124 of the multi-radio service that are associated with any number of edge devices of a client may receive and/or process any number of corresponding messages (e.g., as described above) from any number of different types of edge device radios from the client network at different times, the same time, or at substantially the same time (e.g., concurrently or in parallel). For example, at the same time or at substantially the same time, the radio controller 124a may receive and/or process a message that was transmitted from the LoRa radio 114c of the edge device 112b, the radio controller 124b may receive and/or process a message that was transmitted from the WiFi radio 114d of the edge device 112n, and the radio controller 124n may receive and/or process a message that was transmitted from the Bluetooth radio 114e of the edge device 112n. In embodiments, this may allow the multi-radio service to route payloads from a larger number of edge devices and/or to increase the amount of payload data routed from one or more edge devices at a given time (e.g., increase the bandwidth for routing data to client applications for processing).

In some embodiments, any radio controller may be shared among any number of edge devices of any number of different clients/client networks. For example, a particular radio controller (e.g., radio controller 124b) may be associated with an edge device of a client to process messages for the edge device as described above, and the same radio controller may be associated with another edge device of another client to process other messages for the other edge device as described above (e.g., receive the message, identify and/or extract the payload and metadata, send the extracted payload and/or metadata to another destination or the same destination).

In various embodiments, the multi-radio service may automatically assign a radio controller for use by an edge device. For example, a new type of radio may be activated or added for an edge device that has already been provisioned with other radios that use other protocols. When the edge device sends a message using the new radio, the multi-radio service may identify the radio protocol of the message and assign another radio controller for use by an edge device that is capable of processing messages in the radio protocol of the new radio of the edge device.

In embodiments, an edge device must first join the network of edge devices managed by the multi-radio service/provider network before it can begin sending messages to the client application/service and/or receiving messages from the client application/service. For example, the service may receive, from the edge device, a request to join. The service may identify security data of the request to join (e.g., credentials for the edge device and/or the client). The service may then determine, based on the security credentials, whether to authenticate and/or authorize the edge device. In response, the service accepts or rejects the request to join. For example, if the service determines, based on the credentials, to authenticate and/or to authorize the edge device, then the service accepts the request to join. If the service determines, based on the credentials, not to authenticate and/or not to authorize the edge device, then the service rejects the request to join.

In various embodiments, a given radio controller 124 may also send metadata associated with a given message to the destination (e.g., as part of the payload or at approximately the same time as sending the payload). For example, the radio controller 124 may identify and/or extract the metadata (e.g., based on identification of the data and/or data format specific to the radio protocol).

In embodiments, the metadata may indicate the radio communication protocol used (e.g., WiFi protocol) and/or may indicate an identifier of a radio of an edge device of the remote network that was used to transmit the message from the edge device according to the radio communication protocol (e.g., WiFi protocol). As described herein, the destination service/application and/or the multi-radio service may use the metadata to select which radio of the edge device to download payload data to.

In embodiments, a radio controller may extract non-payload data from the message (e.g., based on identification of the non-payload data, the payload data, and/or data format specific to the radio protocol) and send the extracted non-payload data to a device manager for processing. For example, the radio controller may extract security data from the message (e.g., device and/or client security data/credentials) and send the security data/credentials to the device manager 130. The device manager may then determine, based on the security data, whether to authenticate the message. In response to the determination, the device manager may cause the radio controller to accept or reject the message.

In embodiments, a multi-radio service separates the radio-interface handling from the payload routing (e.g., using a radio controller). As shown in the depicted embodiment, only payload data along with some metadata will be transferred. This reduces the amount of data that is sent to the destination service/application.

Internally, different radios may have their radio-specific IDs, in embodiments. For one edge device equipped with multiple radios, the unique device ID of the edge device can be linked by the multi-radio service to its multiple radio-specific IDs. The device ID and/or radio ID of a radio that transmitted the message may be included in the metadata along with the payload. Therefore, a payload originating from the same edge device, while coming from different radio interfaces, may reach the same cloud application. For example, the router may forward data from that edge device to the cloud application, regardless of which radio interface was used to send the message. In embodiments, the destination application may be completely agnostic of the radio-related information if it only cares about the application logic. In an embodiment, the identifier between the core network (e.g., multi-radio service) and the destination cloud applications is the device ID, which may be mapped to its multiple radio-specific IDs.

For downlink (DL) packets (e.g., messages or payloads to download) from the cloud applications, the core network may provide the APIs having multi-radio options in the request body. In embodiments, the radio options instruct the core network the preferred radio to reach the edge device. The same APIs may be used for different radio selections. In some embodiments, an intelligent radio selection algorithm may be used to select which radio to send the DL packets to if the DL packet does not specify the radio or provides multiple radio options. In embodiments, the radio selection algorithm can make downloading messages to edge device more efficient and more optimized (e.g., by choosing the fastest download option from multiple available edge device radios).

In embodiments, if there is one more radio to be added (e.g., Bluetooth LE), then the only architecture change may be to add one more interface entity—a BLE radio controller. This new radio controller may end the radio-specific information handling and convey only payload and/or metadata to the cloud destination application(s) via the router.

In various embodiments, the separation of the radio controller from the router allows the interface between the core network (e.g., multi-radio service) and the client cloud applications free from radio consideration. It may also give the core network the ability to extend with any number of additional radio connections. Having the support of multiple radios in the same core network improves management of edge devices with multiple radios and also allows the client's cloud applications have more ways to reach to devices.

In embodiments, the architecture of the multi-radio service allows cloud applications to interface with a logical device instead of with each individual physical radio (e.g., by referencing the edge device ID and/or radio ID). This architecture also allows for a simple and convenient way to add new edge device radios to be used for communicating with cloud applications.

Figure 2:
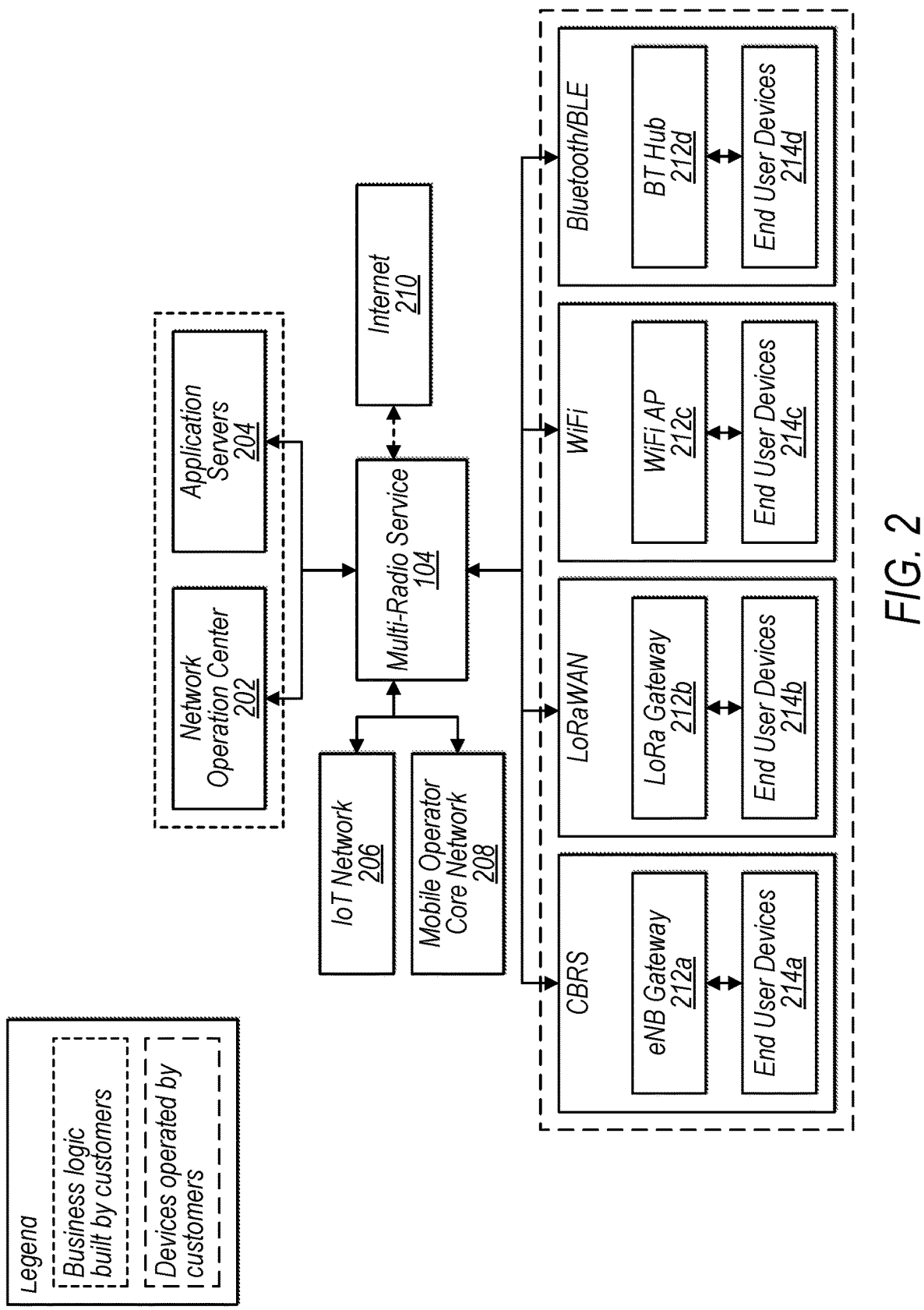
FIG. 2 is a logical block diagram illustrating a system for routing traffic for client edge devices that use multiple types of radios, according to some embodiments.

FIG. 2 is a logical block diagram illustrating a system for routing traffic for client edge devices that use multiple types of radios, according to some embodiments.

In the depicted embodiment, a network operation center 202 and application servers 204 of a provider network may include business logic built by the client/customer of the provider network (e.g., cloud applications that process edge data collected by edge devices). The multi-radio service may communicate with the network operation center 202, the application servers 204, one or more IoT network 206 (e.g., hosted by other servers), a mobile operator core network 208, any number of other devices connected to the internet 210, and any number of different gateways 212 (e.g., gateways 116) that each communicate with any number of end user devices 214 (e.g., edge devices 112) operated by the client/customer.

As shown, a citizens broadband radio system (CBRS) network includes any number of end user devices 214*a* that communicate with the multi-radio service 104 via an eNB gateway 212*a*. A LoRa network includes any number of end user devices 214*b* that communicate with the multi-radio service 104 via a LoRa gateway 212*b*. A WiFi network includes any number of end user devices 214*c* that communicate with the multi-radio service 104 via a WiFi AP 212*b* (e.g., a WiFi gateway). A Bluetooth/BLE network includes any number of end user devices 214*d* that communicate with the multi-radio service 104 via a BT hub 212*d* (e.g., a Bluetooth gateway).

Figure 3:
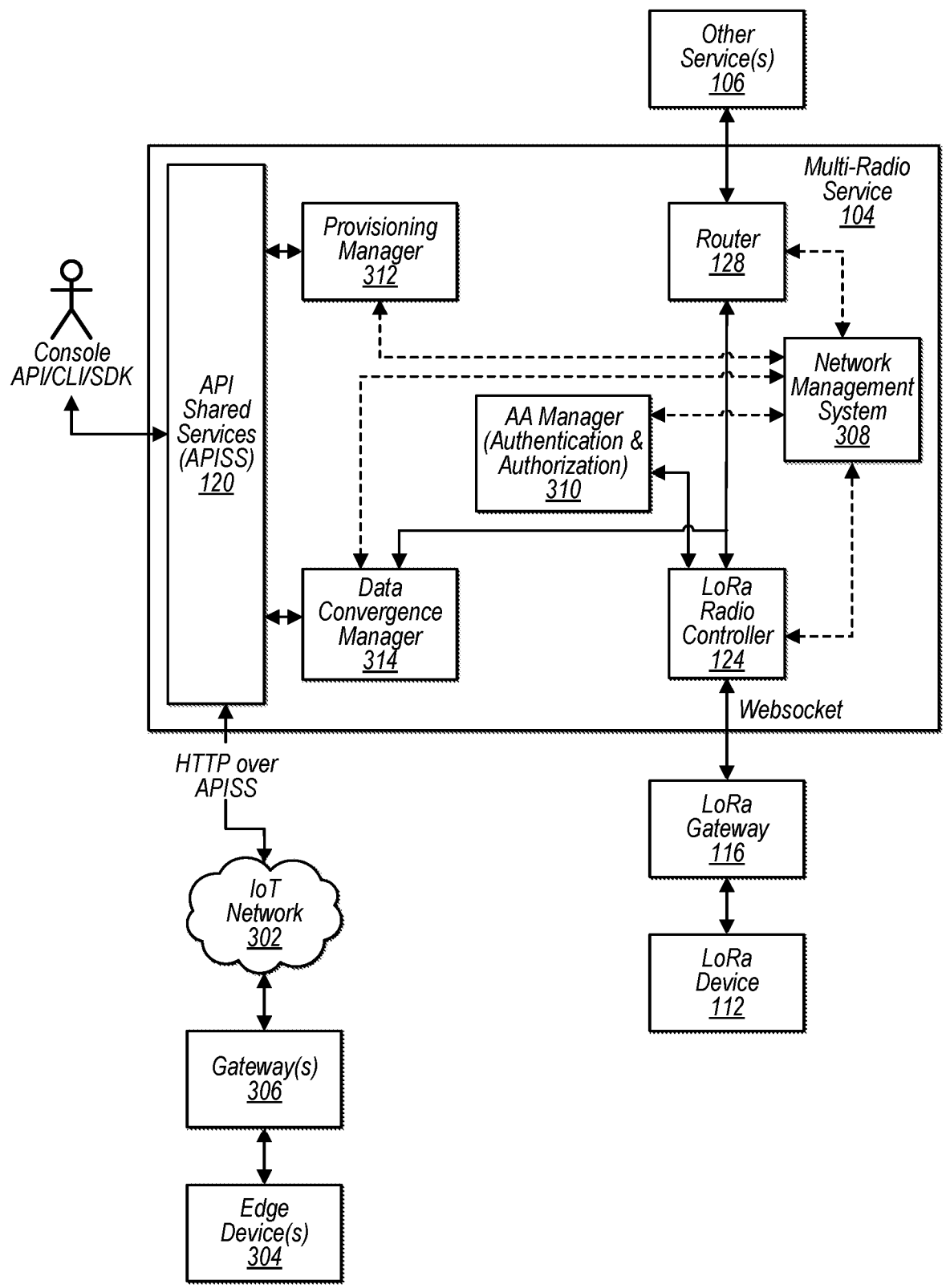
FIG. 3 is a logical block diagram illustrating a system for managing and routing payloads for client edge devices that use multiple types of radios, according to some embodiments.

FIG. 3 is a logical block diagram illustrating a system for managing and routing payloads for client edge devices that use multiple types of radios, according to some embodiments.

The depicted embodiment shows one LoRa radio controller 124. However, the multi-radio service 104 may include any number of other radio controllers that function in the same or similar manner (not shown). The LoRa radio controller 124 may receive (via a LoRa gateway 116) a message that has been transmitted using a LoRa radio of a Lora edge device 112 of a client network. The LoRa Radio controller 124 may extract a payload and/or metadata from the message and forward the payload and/or metadata to a client-owned application/service 106 (via the router 128).

The LoRa Radio controller 124 may also receive a payload from the client-owned application/service 106 (via the router 128), generate a message that includes the payload and additional information (data corresponding to the LoRa protocol and/or formatted according to the Lora protocol), and send the message to the Lora edge device 112 (via a LoRa gateway 116).

In the example embodiment, an IoT network 302 (e.g., a network of edge devices 304 and/or a service at the provider network that manages the edge devices 304) may use the same API 120 (APISS) to perform various functions (e.g., registering devices, routing data to radios, etc.). A user at the client's network may use a management device in order to perform various API calls (e.g., via a command line interface or graphical interface).

In the example embodiment, any other applications/services may also make API calls (e.g., client-owned applications/services 106, IoT network 302, and/or the multi-radio service 104). As shown, the IoT network 302 may receive data from any number of edge devices 304 via a gateway(s) 306 (e.g., using a type of radio protocol(s)).

In the depicted embodiment, the multi-radio service may include a network management system 308, an AA manager 310 (e.g., authentication and authorization of credentials provided by an edge device/join request), a provisioning manager 312, and a data convergence manager 314. The network management system 308 may be a component of the multi-radio service that manages various aspects of the multi-radio service (e.g., communication between components, routing data and/or metadata to and from the radio controller(s) and other components).

The AA manager 310 may perform authentication and/or authorization for client edge devices and/or join requests/messages received from client edge devices. The provisioning manager 312 may manage instantiation and/or configuration of radio controllers and other components of the multi-radio service and/or provisioning/registration of edge devices for a client. The data convergence manager 314 may manage the routing of data from any of the edge devices to applications/services and/or may manage routing of data from any of the applications/services to edge devices. In some embodiments, the functionality of some or all of the above components (network management system 308, AA manager 310, provisioning manager 312, and/or data convergence manager 314) may be performed by one component (e.g., by the device manager 130 of FIG. 1).

Figure 4:
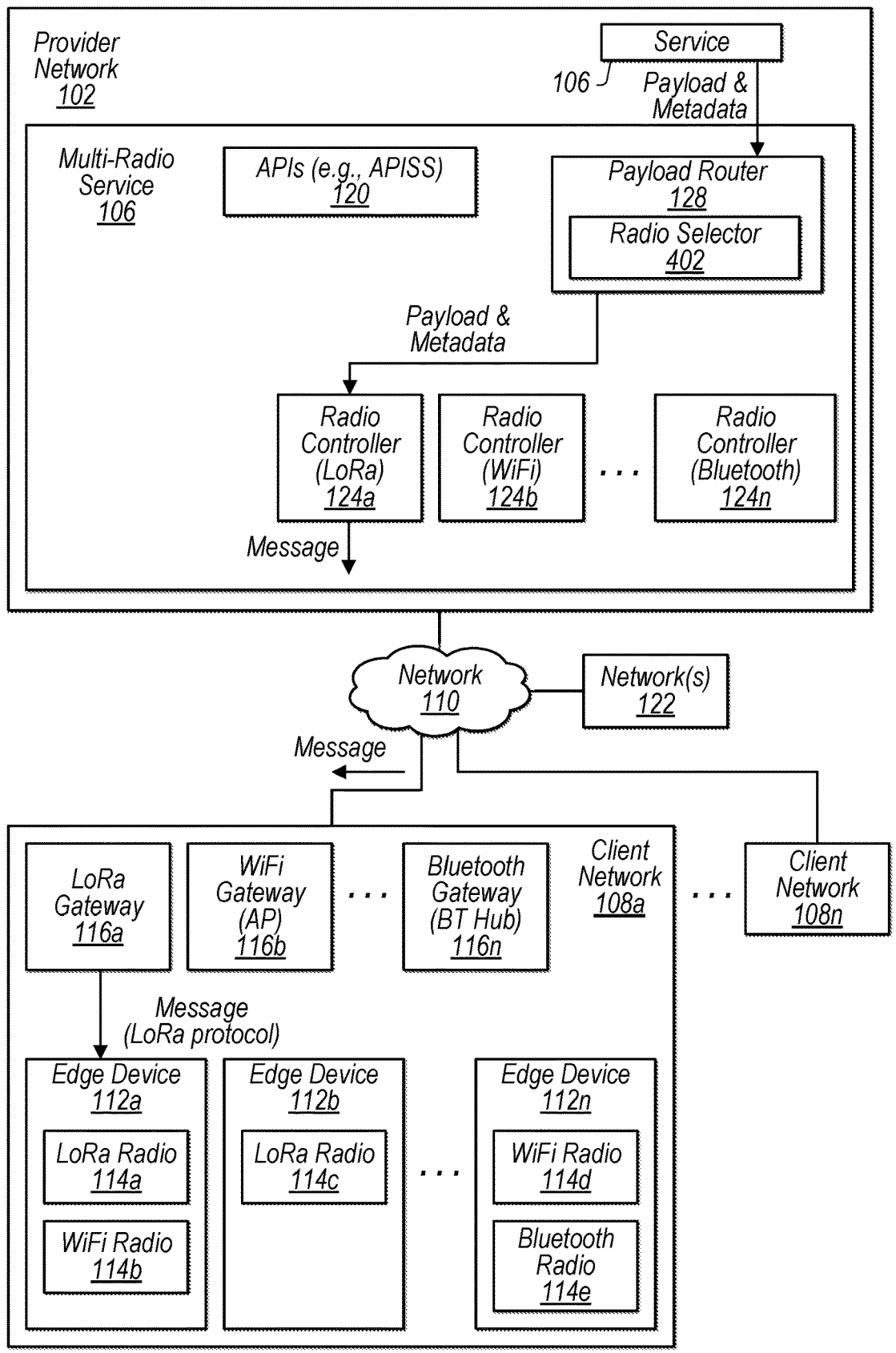
FIG. 4 is a logical block diagram illustrating a system for managing and routing payloads for client edge devices that use multiple types of radios, according to some embodiments.

FIG. 4 is a logical block diagram illustrating a system for managing and routing payloads for client edge devices that use multiple types of radios, according to some embodiments.

As shown, the networks/components of the FIG. 4 may perform functionality described for the corresponding networks/components of FIG. 1. In embodiments, the payload router 128 is capable of routing payloads and/or metadata from radio controllers to services/applications as well as routing payloads from services/applications to the radio controllers (e.g., for eventual transmission to a destination edge device).

In the example embodiment, the payload router 128 includes a radio selector 402 that may select one of the radio controllers from among any number of different radio controllers that are available to generate and send messages to an edge device that has any number of different radios. As shown, a service 106 at the provider network and/or a client-owned application may send a payload and/or metadata to the payload router to be routed to the destination edge device 112a.

In response to receiving the pay payload and/or metadata, the payload router 128 may select, based on one or more criteria, a particular radio of the edge device (LoRa radio 114a) to receive the payload. In embodiments, the payload router 128 may determine (e.g., based on a mapping of the edge device ID to different radio IDs) the different types of radios that are available to send the payload to the edge device 114a.

The payload router 128 may select the particular radio based on any of one or more suitable criteria. For example, to select the particular radio, the payload router may determine that an amount of time to transmit the payload to the edge device using the particular is less than an amount of time to transmit the payload to the edge device using any of the other radios of the edge device and/or the payload router may determine that an amount of power consumed by the particular edge device to receive the payload using the particular radio is less than an amount of power consumed by the edge device to receive the payload using any of the other radios of the edge device and/or the payload router may determine (e.g., based on one or more environmental conditions at the client network), that the particular radio is more reliable than any of the other radios of the edge device for receiving data.

In embodiments, any of the above determinations may be made based on machine learning. For example, example, the radio selector 402 may implement a trained data model (e.g., based on a neural network or other type of artificial intelligence) to determine, based on current environmental conditions (e.g., amount of radio interference for the different edge device radios, signal strength of the different gateway radios) and/or historical performance/reliability of the different edge device radios, the particular radio to be the most reliable of the available radios to transmit data to (e.g., the least most likely to receive the payload/data).

In some embodiments, the services/application may cause the payload to be delivered to a particular radio of the edge device (e.g., edge device 112a) based on an instruction/request. For example, the payload router 128 may receive, from the service 106 via an API (e.g., APIs 120), a request to send the payload to a particular radio (e.g., radio 114a) of the edge device.

In response to receiving the request, the payload router 128 may route the payload (and/or metadata) to a particular radio controller (e.g., LoRa radio controller 124a) and the radio controller generates a message to be sent from the multi-radio service to the particular radio (e.g., LoRa radio 114a) of the edge device. In embodiments, the message includes the payload and additional information (e.g., data corresponding to the Lora protocol and/or formatted according to the Lora protocol). The radio controller may then send the message to the edge device (e.g., via the LoRa gateway 116a).

Figure 5:
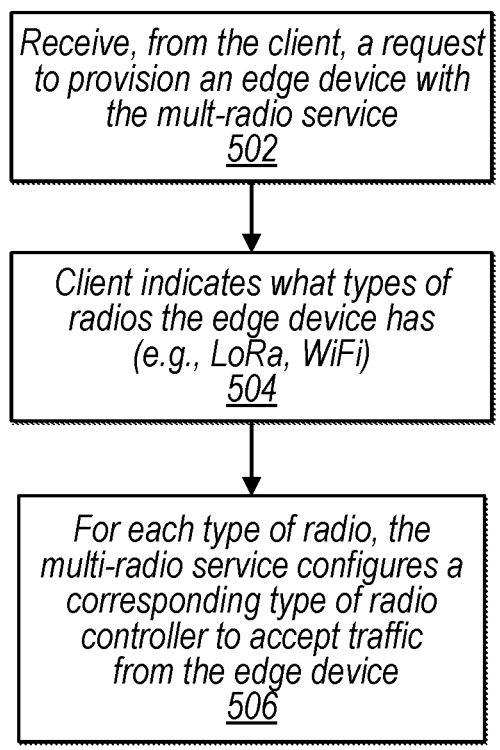
FIG. 5 is a high-level flowchart illustrating various methods and techniques to provision edge devices for a client of a multi-radio service, according to some embodiments.

FIG. 5 is a high-level flowchart illustrating various methods and techniques to provision edge devices for a client of a multi-radio service, according to some embodiments. In various embodiments, any of the functionality described for any portions of the flowcharts 5-7 may be performed by any of the components of FIGS. 1-4 and/or 8.

Figure 6:
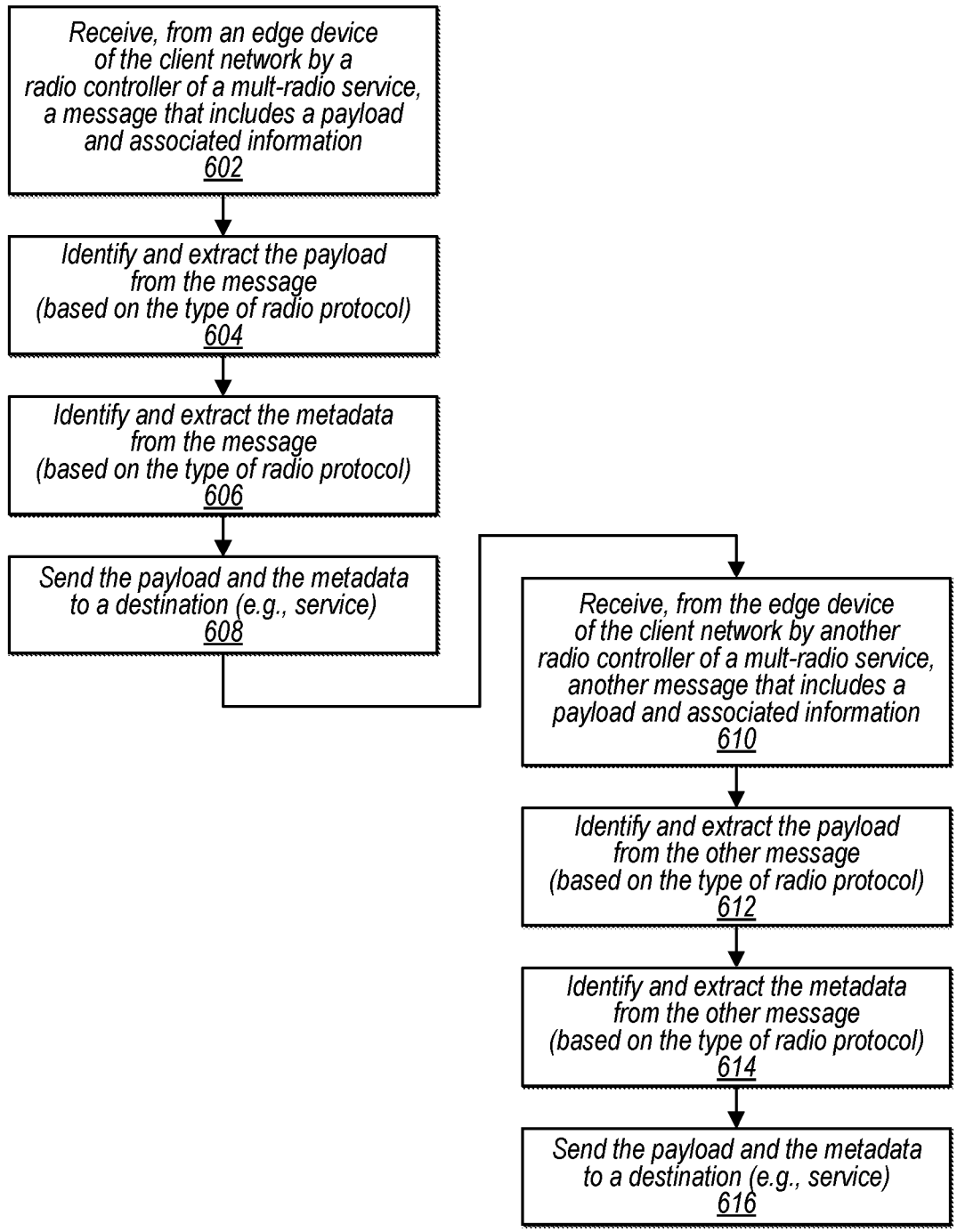
FIG. 6 is a high-level flowchart illustrating various methods and techniques to manage and route payloads from client edge devices that use multiple types of radios, according to some embodiments.
Figure 7:
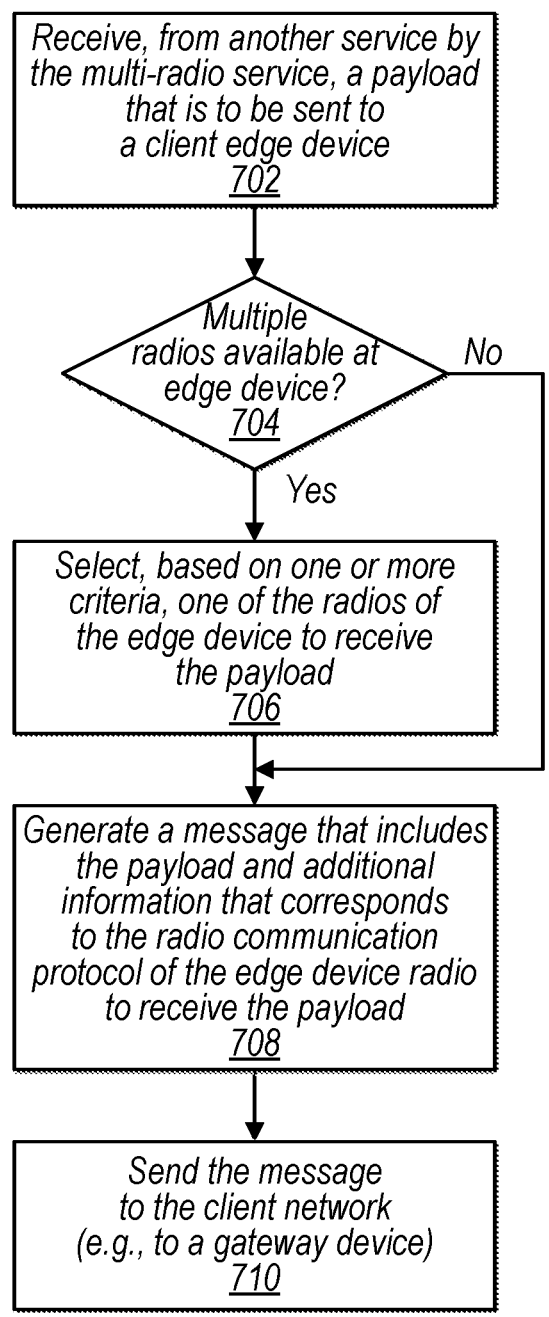
FIG. 7 is a high-level flowchart illustrating various methods and techniques to manage and route payloads to client edge devices that use multiple types of radios, according to some embodiments.

These techniques, as well as the techniques discussed with regard to FIGS. 6 and 7, may be implemented using components or systems as described above with regard to FIGS. 1-4, as well as other types of components or systems, and thus the following discussion is not intended to be limiting as to the other types of systems that may implement the described techniques. For example, any of the techniques may be implemented by one or more services of a provider network and/or a local service/application of a client network.

At block 502, a multi-radio service receives, from a client (e.g., via an API request), a request to provision (e.g., register) an edge device with the multi-radio service. In embodiments, the request may specify any configuration/data that may be used to implement any of the embodiments described herein. For example, the client may provide an ID for the edge device and/or IDs for any radios of the edge device and/or device security credentials to be used for authentication/authorization to allow/deny connection requests. In embodiments, the client may also use the API to register/configure gateway devices.

At block 504, the client indicates what types of radios the edge device has (e.g., via a type of user interface or command line as described herein). In embodiments, the client may indicates any number of types of radios that the edge device has (e.g., LoRa, WiFi, etc.). At block 506, for each type of radio indicated by the client, the service configures a corresponding type of radio controller to accept traffic from the edge device.

As an example, the service may assign a particular LoRa radio controller instance/micro-service to send and receive messages for the edge device and the service may also assign a particular WiFi radio controller instance/micro-service to send and receive messages for the edge device. In embodiments, after the radio controllers are configured, then any of the configured radio controllers may receive a join request from the edge device and handle messages for the edge device as described herein. In some embodiments, to assign a radio controller, the service may select a radio controller instance/micro service from a pool of multiple instances/micro services that are available and assign the selected radio controller to send and receive messages for the edge device.

FIG. 6 is a high-level flowchart illustrating various methods and techniques to manage and route payloads from client edge devices that use multiple types of radios, according to some embodiments.

At block 602, a multi-radio service (e.g., a radio controller) receives, from an edge device of a client network, a message that includes a payload and associated information (e.g., data corresponding to a radio communication protocol used to transmit the message at the remote network and/or in a format specific to the radio communication protocol). At block 604, the radio controller identifies the payload and extracts the identified payload from the message. The identification and/or extraction may be based on the radio controller's knowledge/awareness of a format of messages for the radio communication protocol used to transmit the message at the remote network.

At block 606, the radio controller identifies the metadata and extracts the identified metadata from the message. The identification and/or extraction may be based on the radio controller's knowledge/awareness of a format of messages for the radio communication protocol used to transmit the message at the remote network. At block 608, the radio controller sends the extracted payload and/or the metadata to a destination for processing (e.g., to the service and/or client-owned application).

At block 610, a multi-radio service (e.g., another radio controller) receives, from the edge device (or another edge device of the client network), another message that includes a another payload and associated information (e.g., data corresponding to another radio communication protocol used to transmit the message at the remote network and/or in a format specific to the other radio communication protocol). At block 612, the other radio controller identifies the other payload and extracts the identified other payload from the message. The identification and/or extraction may be based on the other radio controller's knowledge/awareness of a format of messages for the other radio communication protocol used to transmit the message at the remote network.

At block 614, the other radio controller identifies the other metadata and extracts the identified other metadata from the other message. The identification and/or extraction may be based on the other radio controller's knowledge/awareness of a format of messages for the other radio communication protocol used to transmit the other message at the remote network. At block 616, the other radio controller sends the extracted payload and/or the metadata to a destination for processing (e.g., to the service and/or client-owned application).

Although FIG. 6 illustrates manages and routing payloads for two different types of radios using two different types of radio controllers, in various embodiments payloads may be managed/routed for any number of different types of radios using any number of different types of radio controllers. For example, blocks 610-616 may be repeated for any number of different types of radio controllers.

FIG. 7 is a high-level flowchart illustrating various methods and techniques to manage and route payloads to client edge devices that use multiple types of radios, according to some embodiments.

At block 702, a router of a multi-radio service receives, from another service and/or client-owned application, a payload that is to be sent to a client edge device. At block 704, router determines whether there are multiple radios available to receive the payload at the edge device. If not, then the router sends the payload to the radio controller associated with the only available radio of the edge device and the process proceeds to block 708.

If the router determines there are multiple radios available to receive the payload at the edge device, then at block 706, the router selects, based on one or more criteria, one of the radios of the edge device to receive the payload. The router sends the payload to the radio controller associated with the selected radio of the edge device.

At block 708, the radio controller generates a message that includes the payload and/or additional information that corresponds to the radio communication protocol of the edge device radio to receive the payload (e.g., data and/or data format specific to the radio protocol). At block 710, the radio controller sends the message to the client network, where it is transmitted to the radio of the edge device. For example, the message may be transmitted to a particular gateway and the gateway transmits the message to the edge device.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of the multi-radio service, radios, and any other components that implement the techniques described herein). The various methods as illustrated in the figures and described herein represent example embodiments of methods. The order of any method may be changed, and various elements may be added, reordered, combined, omitted, modified, etc.

Figure 8:
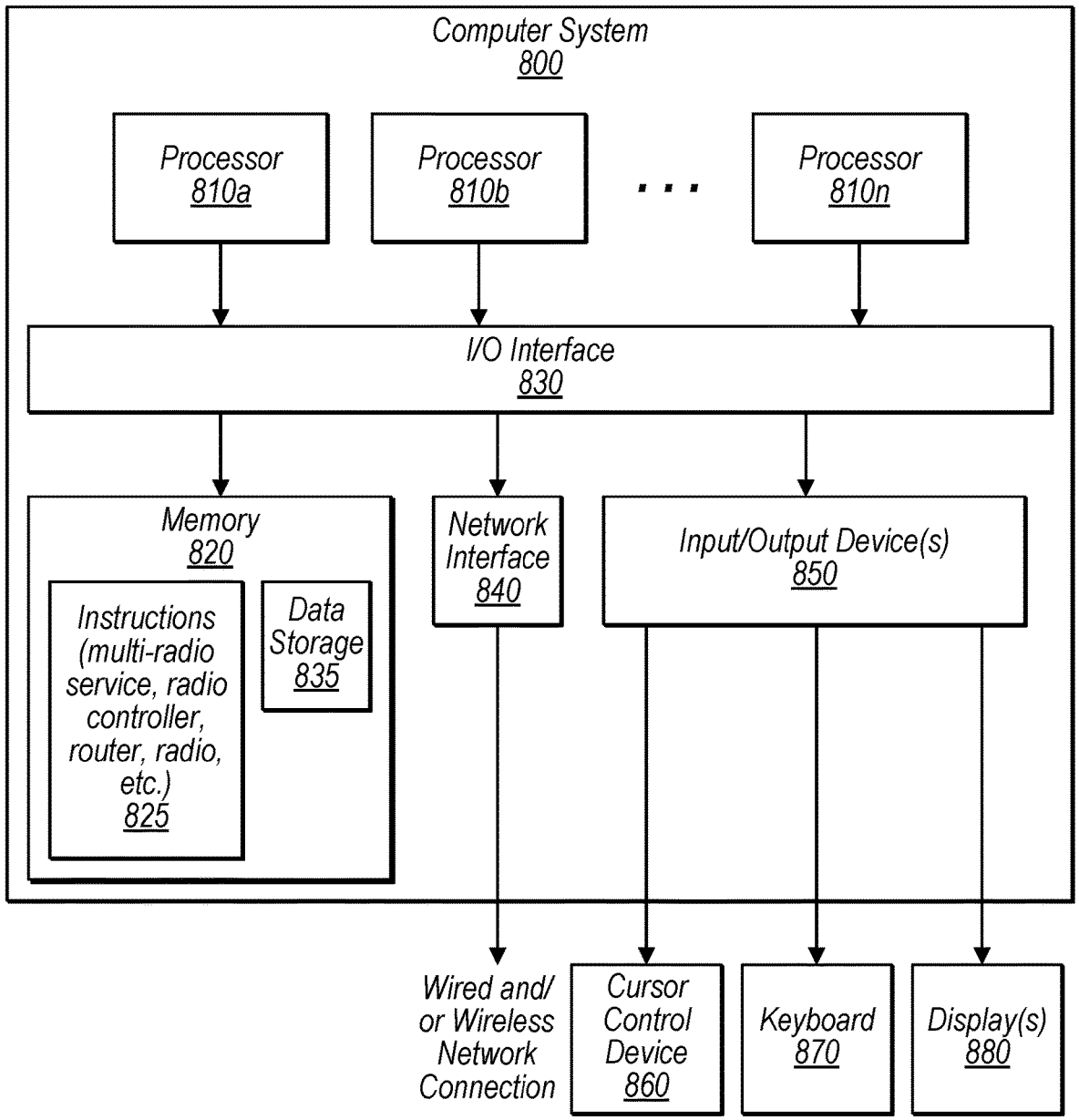
FIG. 8 is a block diagram illustrating an example computing system, according to some embodiments.

Embodiments to implement managing and routing payloads for client edge devices that use multiple types of radios as described herein may be executed on one or more computer systems, which may interact with various other systems or devices. One such computer system is illustrated by FIG. 8. In different embodiments, computer system 800 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, and display(s) 880. Display(s) may include standard computer monitor(s) and/or other display systems, technologies or devices, in one embodiment. In some embodiments, it is contemplated that embodiments may be implemented using a single instance of computer system 800, while in other embodiments multiple such systems, or multiple nodes making up computer system 800, may host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions, in one embodiment. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

In some embodiments, at least one processor 810 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 820 may store program instructions 825 and/or data accessible by processor 810, in one embodiment. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., mutli-radio service, radios, and any other components, etc.) are shown stored within system memory 820 as program instructions 825 and data storage 835, respectively. In other embodiments, program instructions and/or data may be received, sent or stored upon different types of computer-accessible media or on similar media separate from system memory 820 or computer system 800. A computer-accessible medium may include non-transitory storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840, in one embodiment.

In one embodiment, I/O interface 830 may be coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may allow data to be exchanged between computer system 800 and other devices attached to a network, such as other computer systems, or between nodes of computer system 800, in one embodiment. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800, in one embodiment. Multiple input/output devices 850 may be present in computer system 800 or may be distributed on various nodes of computer system 800, in one embodiment. In some embodiments, similar input/output devices may be separate from computer system 800 and may interact with one or more nodes of computer system 800 through a wired or wireless connection, such as over network interface 840.

As shown in FIG. 8, memory 820 may include program instructions 825 that implement the various embodiments of the systems as described herein, and data store 835, comprising various data accessible by program instructions 825, in one embodiment. In one embodiment, program instructions 825 may include software elements of embodiments as described herein and as illustrated in the Figures. Data storage 835 may include data that may be used in embodiments (e.g., messages, payload data, data specific to a radio communication protocol, etc.). In other embodiments, other or different software elements and data may be included.

Those skilled in the art will appreciate that computer system 800 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 800 may be transmitted to computer system 800 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more processors and one or more memories, wherein the one or more memories have stored thereon instructions, which when executed by the one or more processors, cause the one or more processors to implement a multi-radio service for a plurality of clients of a provider network, wherein the multi-radio service is configured to, for a given client:

associate a radio controller of the multi-radio service of the provider network with an edge device of the client, wherein the radio controller is configured to:
      receive, by the radio controller of the multi-radio service of the provider network from a gateway device of a remote network of the client of the provider network, a message originating from the edge device of the remote network and comprising a payload and associated information, wherein the payload comprises data to be processed at a destination service of the provider network, and wherein the associated information of the message comprises data corresponding to a radio communication protocol used to transmit the message from the edge device to the gateway device within the remote network of the client before the message is sent from the gateway device of the remote network of the client to the radio controller of the multi-radio service of the provider network over a connection established by the gateway device with the radio controller in accordance with a different communication protocol than the radio communication protocol used by the edge device;
      extract the payload from the message; and
      send the extracted payload to the destination service; and
   associate another radio controller of the multi-radio service of the provider network with the same edge device of the client, wherein the other radio controller is configured to:
      receive, by the other radio controller of the multi-radio service of the provider network from another gateway device of the remote network of the client of the provider network, another message originating from the same edge device of the remote network and comprising another payload and other associated information, wherein the other payload comprises data to be processed at the destination service, and wherein the other associated information of the other message comprises data corresponding to another radio communication protocol that was used to transmit the other message from the same edge device to the other gateway device within the remote network of the client before the other message is sent from the other gateway device of the remote network of the client to the other radio controller of the multi-radio service of the provider network over another connection established by the other gateway device with the other radio controller in accordance with the different communication protocol
      extract the other payload from the other message; and
      send the extracted other payload to the destination service.

2. The system as recited in claim 1, wherein the multi-radio service is further configured to:
   send metadata associated with the message to the destination service, wherein the metadata indicates one or more of:
      the radio communication protocol, or
      an identifier of a radio of the edge device of the remote network used to transmit the message from the edge device according to the radio communication protocol; and send other metadata associated with the other message to the destination service, wherein the other metadata indicates one or more of:
the other radio communication protocol, or
an identifier of the radio of the edge device of the remote network used to transmit the other message from the edge device according to the other radio communication protocol.

3. The system as recited in claim 2, wherein the message and the other message are from the edge device at the remote network, and wherein the multi-radio service is further configured to:
receive an additional payload from the destination service, wherein the additional payload is to be sent to the edge device;
select, based on one or more criteria, a radio from a plurality of radios of the edge device available to receive the payload; and
in response to the selection, generate an additional message to be sent from the multi-radio service to the edge device, wherein the additional message comprises the additional payload and additional information, wherein the additional information comprises data corresponding to a radio communication protocol of the selected radio.

4. The system as recited in claim 1, wherein the multi-radio service is further configured to:
associate the radio controller with another edge device of another client, wherein the radio controller is configured to:
receive, from a remote network of the other client, another message comprising another payload and other associated information, wherein the other payload comprises data to be processed at another destination service of the provider network, and wherein the other associated information comprises data corresponding to the radio communication protocol;
extract the other payload from the other message; and
send the extracted other payload to the other destination service.

5. The system as recited in claim 1, wherein the multi-radio service is further configured to:
receive, from the edge device, a request to join;
identify security data of the request to join;
determine, based on the security data, whether to authenticate the edge device; and
in response to the determination, accept or reject the request to join.

6. A method, comprising:
performing, by one or more computing devices of a provider network:
receiving, from a gateway device of a remote network of a client of the provider network, by a radio controller of a multi-radio service of the provider network, a message originating from the edge device of the remote network and comprising a payload and associated information, wherein the associated information of the message comprises data corresponding to a radio communication protocol for a radio used to transmit the message from the edge device to the gateway device within the remote network of the client before the message is sent from the gateway device of the remote network of the client to the radio controller of the multi-radio service of the provider network over a connection established by the gateway device with the radio controller in accordance with a different communication protocol than the radio communication protocol used by the edge device;
extracting the payload from the message;
sending the extracted payload to a destination;
receiving, from another gateway device of the remote network of the client of the provider network, at another radio controller of the multi-radio service of the provider network, another message originating from the same edge device of the remote network and comprising another payload and other associated information, wherein the other associated information of the other message comprises data corresponding to another radio communication protocol for another radio that was used to transmit the other message from the same edge device to the other gateway device within the remote network of the client before the other message is sent from the other gateway device of the remote network of the client to the other radio controller of the multi-radio service of the provider network over another connection established by the other gateway device with the other radio controller in accordance with the different communication protocol;
extracting the other payload from the other message; and
sending the extracted other payload to the destination or another destination.

7. The method as recited in claim 6, further comprising:
sending metadata associated with the message to the destination, wherein the metadata indicates one or more of:
the radio communication protocol, or
an identifier of a radio of the remote network used to transmit the message according to the radio communication protocol; and
sending other metadata associated with the other message to the destination, wherein the other metadata indicates one or more of:
the other radio communication protocol, or
an identifier of another radio of the remote network used to transmit the other message according to the other radio communication protocol.

8. The method as recited in claim 6, wherein an edge device comprises the radio and the other radio, and further comprising:
receiving an additional payload from the destination or other destination, wherein the additional payload is to be sent to the edge device;
selecting, based on one or more criteria, a radio from a plurality of radios of the edge device available to receive the payload; and
in response to the selection, generating an additional message to be sent from the multi-radio service to the edge device, wherein the additional message comprises the additional payload and additional information, wherein the additional information comprises data corresponding to a radio communication protocol of the selected radio.

9. The method as recited in claim 8, wherein the selecting the radio comprises:
determining that an amount of time to transmit the additional payload to the edge device using the radio is less than an amount of time to transmit the additional payload to the edge device using the other radio, or
determining that an amount of power consumed by the edge device to receive the additional payload using the radio is less than an amount of power consumed by the edge device to receive the additional payload using the other radio.

10. The method as recited in claim 6, wherein an edge device comprises the radio and the other radio, and further comprising:
receiving, from the destination or the other destination via an application programming interface, a request to send an additional payload to the radio of the edge device; and
in response to the request, generating an additional message to be sent from the multi-radio service to the edge device, wherein the additional message comprises the additional payload and additional information, wherein the additional information comprises data corresponding to the radio communication protocol.

11. The method as recited in claim 6, further comprising:
receiving, from an edge device of a remote network of another client by the radio controller, another message comprising another payload and other associated information, wherein the other payload comprises data to be processed at another destination service of the provider network, and wherein the other associated information comprises data corresponding to the radio communication protocol;
extracting the other payload from the other message; and
sending the extracted other payload to the other destination service.

12. The method as recited in claim 6, wherein an edge devices comprises the radio, and further comprising:
receiving, from the edge device, a request to join;
identifying security data of the request to join;
determining, based on the security data, whether to authenticate the edge device; and
in response to the determination, accepting or rejecting the request to join.

13. The method as recited in claim 6, wherein the extracting the payload from the message comprises:
decrypting at least a portion of the message based at least on the radio communication protocol used to transmit the message at the remote network.

14. The method as recited in claim 6, further comprising:
sending metadata associated with the message to the destination, wherein the metadata indicates:
an identifier for an edge device that transmitted the message at the remote network, and
an identifier of a radio of the edge device used to transmit the message according to the radio communication protocol.

15. One or more non-transitory computer-accessible storage media storing program instructions that when executed on or across one or more processors of a provider network cause the one or more processors to:
receive, from a gateway device of a remote network of a client of the provider network, by a radio controller of a multi-radio service of the provider network, a message originating from the edge device of the remote network and comprising a payload and associated information, wherein the associated information of the message comprises data corresponding to a radio communication protocol for a radio used to transmit the message from the edge device to the gateway device within the remote network of the client before the message is sent from the gateway device of the remote network of the client to the radio controller of the multi-radio service of the provider network over a connection established by the gateway device with the radio controller in accordance with a different communication protocol than the radio communication protocol used by the edge device;
extract the payload from the message;
send the extracted payload to a destination;
receive, from another gateway device of the remote network of the client of the provider network, at another radio controller of the multi-radio service of the provider network, another message originating from the same edge device of the remote network and comprising another payload and other associated information, wherein the other associated information of the other message comprises data corresponding to another radio communication protocol for another radio that was used to transmit the other message from the same edge device to the other gateway device within the remote network of the client before the other message is sent from the other gateway device of the remote network of the client to the other radio controller of the multi-radio service of the provider network over another connection established by the other gateway device with the other radio controller in accordance with the different communication protocol
extract the other payload from the other message; and
send the extracted other payload to the destination or another destination.

16. The one or more storage media as recited in claim 15, wherein the program instructions when executed on or across the one or more processors further cause the one or more processors to:
send metadata associated with the message to the destination, wherein the metadata indicates one or more of:
the radio communication protocol, or
an identifier of a radio of the remote network used to transmit the message according to the radio communication protocol; and
send other metadata associated with the other message to the destination, wherein the other metadata indicates one or more of:
the other radio communication protocol, or
an identifier of another radio of the remote network used to transmit the other message according to the other radio communication protocol.

17. The one or more storage media as recited in claim 15, wherein an edge device comprises the radio and the other radio, and wherein the program instructions when executed on or across the one or more processors further cause the one or more processors to:
receive an additional payload from the destination or other destination, wherein the additional payload is to be sent to the edge device of the network of the client;
select, based on one or more criteria, a radio from a plurality of radios of the edge device available to receive the payload; and
in response to the selection, generate an additional message to be sent from the multi-radio service to the edge device, wherein the additional message comprises the additional payload and additional information, wherein the additional information comprises data corresponding to the selected radio communication protocol.

18. The one or more storage media as recited in claim 17, wherein to select the radio, the program instructions when executed on or across the one or more processors further cause the one or more processors to:
determine, based on one or more environmental conditions at the network of the client, that the radio is more reliable than the other radio for receiving data.

19. The one or more storage media as recited in claim 15, wherein an edge device comprises the radio and the other radio, and wherein the program instructions when executed on or across the one or more processors further cause the one or more processors to:
  receive, from the destination or the other destination via an application programming interface, a request to send an additional payload to the radio of the edge device; and
  in response to the request, generate an additional message to be sent from the multi-radio service to the edge device, wherein the additional message comprises the additional payload and additional information, wherein the additional information comprises data corresponding to the radio communication protocol.

20. The one or more storage media as recited in claim 15, wherein the program instructions when executed on or across the one or more processors further cause the one or more processors to:
  receive, from an edge device of a remote network of another client by the radio controller, another message comprising another payload and other associated information, wherein the other payload comprises data to be processed at another destination service of the provider network, and wherein the other associated information comprises data corresponding to the radio communication protocol;
  extract the other payload from the other message; and
  send the extracted other payload to the other destination service.

* * * * *